US012587609B2

(12) United States Patent (10) Patent No.: US 12,587,609 B2
Ko et al. (45) Date of Patent: Mar. 24, 2026

(54) ELECTRONIC DEVICE AND CONTROL METHOD FOR CONTROLLING SPEED OF WORKOUT VIDEO

(71) Applicant: SAMSUNG ELECTRONICS CO., LTD., Suwon-si (KR)

(72) Inventors: Jihae Ko, Suwon-si (KR); Seunggu Kang, Suwon-si (KR); Sangmi Kim, Suwon-si (KR); Taehwan Son, Suwon-si (KR); Bosung Jung, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 87 days.

(21) Appl. No.: 18/241,849

(22) Filed: Sep. 2, 2023

(65) Prior Publication Data

US 2023/0412759 A1 Dec. 21, 2023

Related U.S. Application Data

(63) Continuation of application No. PCT/KR2022/002112, filed on Feb. 11, 2022.

(30) Foreign Application Priority Data

Mar. 12, 2021 (KR) ........................ 10-2021-0032798

(51) Int. Cl.
*H04N 5/91* (2006.01)
*H04N 5/76* (2006.01)
(Continued)

(52) U.S. Cl.
CPC ............. *H04N 5/783* (2013.01); *H04N 9/802* (2013.01); *H04N 21/43074* (2020.08)

(58) Field of Classification Search
CPC .. H04N 5/91; H04N 5/76; H04N 5/78; H04N 21/40; H04N 9/08
(Continued)

(56) References Cited

U.S. PATENT DOCUMENTS

| | | | |
|---|---|---|---|
| 7,518,054 | B2 | 4/2009 | McKinney et al. |
| 10,108,855 | B2 | 10/2018 | Lim et al. |

(Continued)

FOREIGN PATENT DOCUMENTS

| | | | |
|---|---|---|---|
| JP | 2002042168 | A | 2/2002 |
| JP | 2010227173 | A | 10/2010 |

(Continued)

OTHER PUBLICATIONS

Extended European Search Report corresponding to Application No. 22767347.1122; Dated Jun. 25, 2024.
(Continued)

*Primary Examiner* — Daquan Zhao
(74) *Attorney, Agent, or Firm* — CANTOR COLBURN LLP

(57) ABSTRACT

An electronic device includes a display and at least one processor operatively connected to the display. The at least one processor may play a workout video through the display, identify the speed of a workout move included in the workout video, identify an audio signal that is distinct from the workout video, identify a target play speed of the workout video at which the speed of the workout move corresponds to the tempo of the audio signal, and control a play speed of the workout video such that the play speed corresponds to the identified target play speed of the workout video.

18 Claims, 10 Drawing Sheets

(51) Int. Cl.
*H04N 5/783* (2006.01)
*H04N 9/802* (2006.01)
*H04N 21/43* (2011.01)
*H04N 5/78* (2006.01)
*H04N 21/40* (2011.01)

(58) Field of Classification Search
USPC ........................................ 386/278, 280, 300
See application file for complete search history.

(56) References Cited

U.S. PATENT DOCUMENTS

| | | | | |
|---|---|---|---|---|
| 2002/0168176 | A1* | 11/2002 | Iizuka | G06F 16/489 |
| | | | | 386/248 |
| 2007/0044641 | A1 | 3/2007 | McKinney et al. | |
| 2010/0186578 | A1 | 7/2010 | Bowen | |
| 2012/0033132 | A1* | 2/2012 | Chen | G11B 27/28 |
| | | | | 348/E7.001 |
| 2012/0256737 | A1* | 10/2012 | Park | H04N 21/4854 |
| | | | | 340/12.54 |
| 2013/0242190 | A1* | 9/2013 | Kamei | H04N 5/06 |
| | | | | 348/515 |
| 2013/0282157 | A1 | 10/2013 | Shin et al. | |
| 2016/0099022 | A1 | 4/2016 | Espeset et al. | |
| 2017/0046600 | A1 | 2/2017 | Lim et al. | |
| 2018/0197578 | A1* | 7/2018 | Ridder | G11B 27/031 |
| 2021/0097746 | A1* | 4/2021 | Krishnan Gorumkonda | |
| | | | | G06T 13/80 |

FOREIGN PATENT DOCUMENTS

| | | | |
|---|---|---|---|
| JP | 2014056243 | A | 3/2014 |
| JP | 2016174893 | A | 10/2016 |
| JP | 6573739 | B1 | 8/2019 |
| JP | 2019130264 | A | 8/2019 |
| KR | 20060081869 | A | 7/2006 |
| KR | 100784926 | B1 | 12/2007 |
| KR | 100981691 | B1 | 9/2010 |
| KR | 20110091097 | A | 8/2011 |
| KR | 101571361 | B1 | 11/2015 |
| KR | 20160138682 | A | 12/2016 |
| KR | 20170018529 | A | 2/2017 |
| KR | 102058716 | B1 | 12/2019 |
| WO | 2011049766 | A2 | 4/2011 |
| WO | 2017010697 | A1 | 1/2017 |

OTHER PUBLICATIONS

Request for the Submission of an Opinion corresponding to Application No. 10-2021-0032798; Dated Jun. 27, 2025.

* cited by examiner

410

6000 ms

420

3000 ms

Heart rate per minute

FIG. 7

ELECTRONIC DEVICE AND CONTROL METHOD FOR CONTROLLING SPEED OF WORKOUT VIDEO

CROSS-REFERENCE TO RELATED APPLICATION(S)

This application is a continuation application, claiming priority under § 365(c), of International Application No. PCT/KR2022/002112, filed on Feb. 11, 2022, which is based on and claims the benefit of Korean patent application number 10-2021-0032798, filed on Mar. 12, 2021, the disclosures of which are incorporated by reference herein in their entireties.

TECHNICAL FIELD

The embodiments of the disclosure relate to an electronic device and a control method for controlling the speed of a workout video.

BACKGROUND ART

As the interest and demand in home training increases, the number of various home training videos is increasing. As the number of various videos increases, the number of services that collect the various videos into playlists and programs or customized services that recommend suitable videos to users is increasing.

A home training video may include a series of workout motions, and a user watches the video and follows the motions at the same time to perform the home training, and depending on the video, a trainer's coaching message and background music may be included.

DETAILED DESCRIPTION OF THE INVENTION

Technical Problem

While the speed of a workout video is fixed, the workout speed desired by each user or with which the user is able to keep up may be different. Accordingly, when the user is not able to keep up with the speed of the workout video even if he/she wants to, the user may easily give up the workout or may get injured while overexerting himself/herself to follow the workout video.

A user generally wants to find a workout video with a level of difficulty suitable for him/her. However, the user may have difficulty in finding a workout video with a level of difficulty suitable for him/her due to cases in which the level of difficulty is simply classified as a high level of difficulty, a medium level of difficulty, or a low level of difficulty or is not even classified.

In addition, when music desired by the user is reproduced separately from the workout video to increase interest in the workout, the user may be aware of the difference between the music and the workout video due to the motion speed of the workout video and the beat of music not matching each other.

Example aspects of the present disclosure provide an electronic device and a control method that support providing a workout video at a playback speed suitable for the user to enable the user to perform the workout while listening to music separate from the workout video, without perceiving a difference between the music and the workout video.

Technical Solution

According to various embodiments, an electronic device includes a display and at least one processor operatively connected to the display. The at least one processor is configured to reproduce a workout video through the display, identify the speed of a workout motion included in the workout video, identify an audio signal distinct from the workout video, identify a target playback speed of the workout video at which the speed of the workout motion corresponds to the tempo of the audio signal, and set the playback speed of the workout video to the identified target playback speed of the workout video.

According to various embodiments, a method for controlling an electronic device includes reproducing a workout video through a display, identifying the speed of a workout motion included in the workout video, identifying an audio signal distinct from the workout video, identifying a target playback speed of the workout video at which the speed of the workout motion corresponds to the tempo of the audio signal, and setting the playback speed of the workout video to the identified target playback speed of the workout video.

Advantageous Effects

An electronic device according to various embodiments may control the playback speed of a workout video according to the tempo and beat of an audio signal that is reproduced separately from the workout video, thereby increasing a user's interest and efficiency.

In addition, according to various embodiments, a workout video may be provided at an appropriate playback speed suitable for a user's workout ability to prevent the user from being injured, and the user may be encouraged to adjust (e.g., improve, increase, decrease) his/her workout speed, thereby increasing user's interest and efficiency.

According to various embodiments, the electronic device may maintain the playback speed of sound included in the workout video even when the playback speed of the workout video is changed, thereby providing a workout video without a sense of difference.

BRIEF DESCRIPTION OF DRAWINGS

FIG. 7 illustrates a target heart rate according to various embodiments.

MODE FOR CARRYING OUT THE INVENTION

Figure 1:
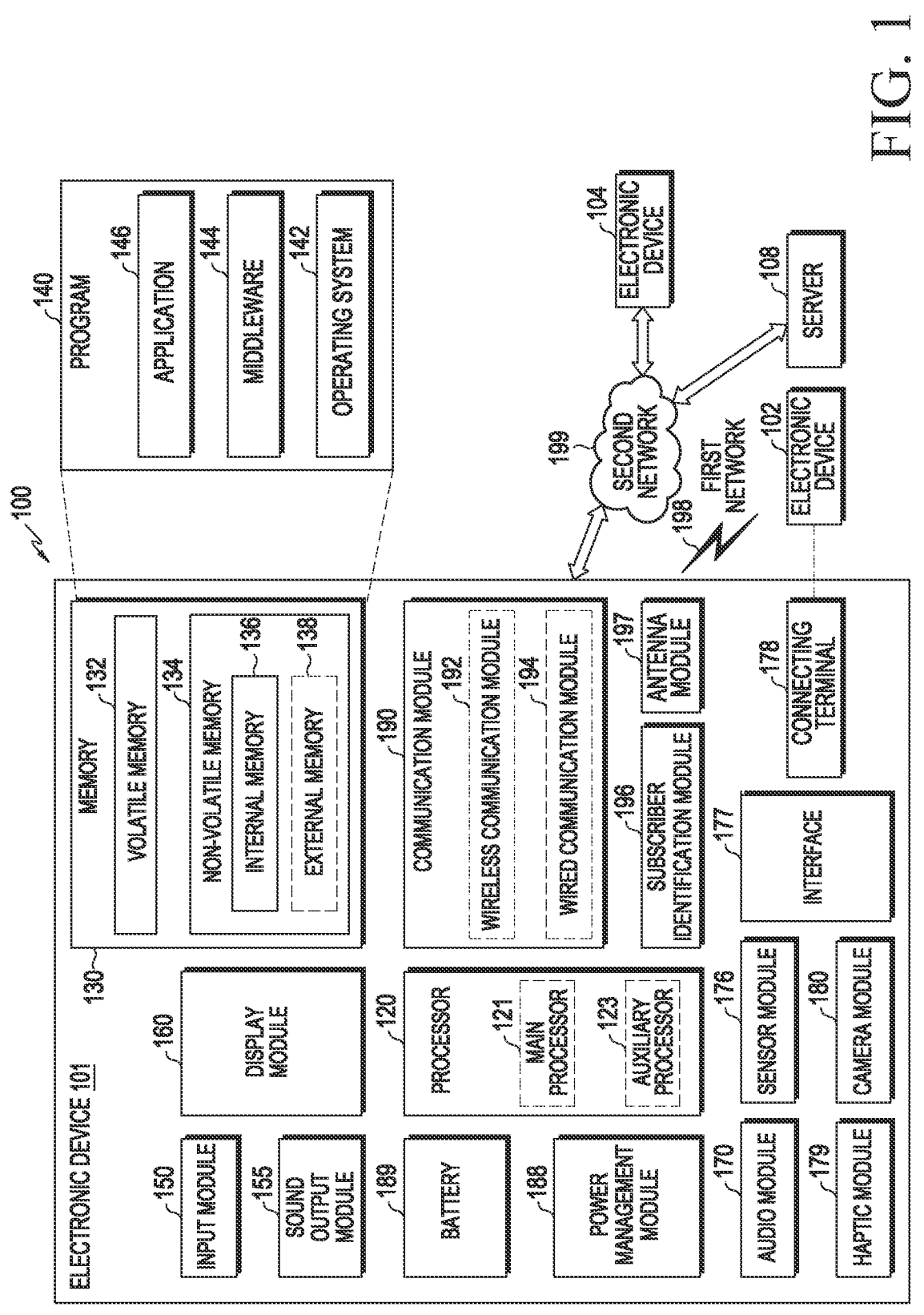
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as reproducing multimedia or reproducing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
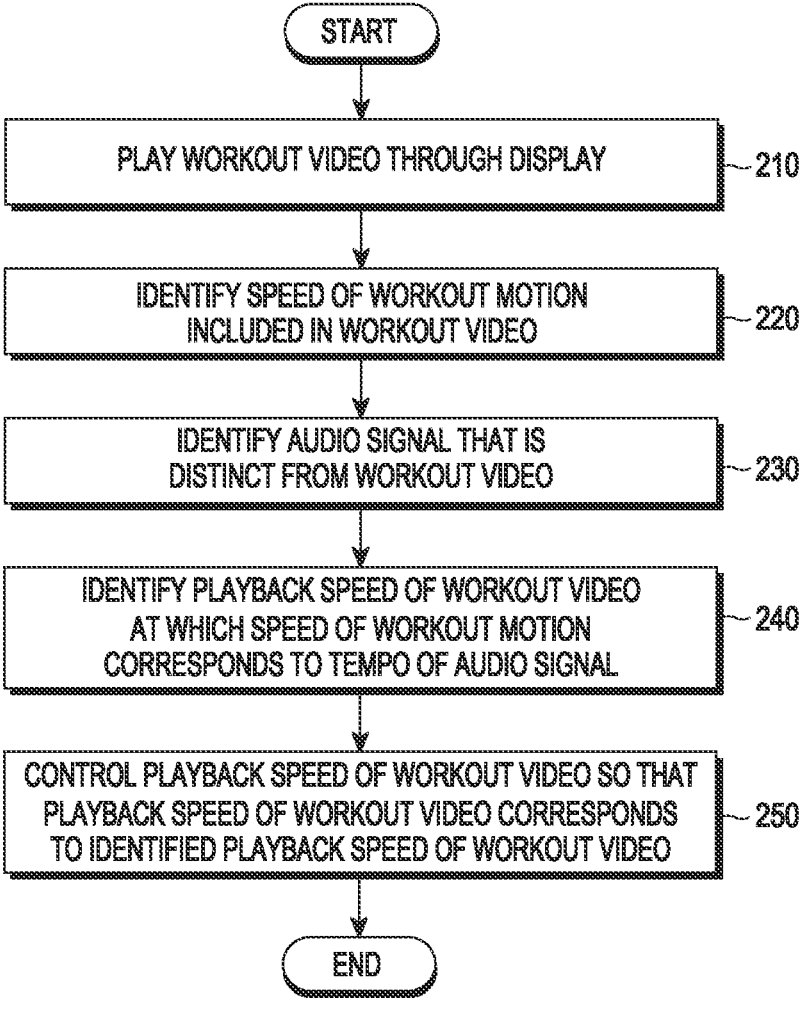
FIG. 2 illustrates an operation by an electronic device of controlling the playback speed of a workout video according to various embodiments.

FIG. 2 illustrates an operation of controlling the playback speed of a workout video of an electronic device according to various embodiments. The terms "reproducing speed," "reproduction speed," "video speed," "playback speed," and "play speed" may be used interchangeably herein.

According to various embodiments, referring to FIG. 2, in operation 210, the electronic device (e.g., the electronic device 101 of FIG. 1 or the processor 120 of FIG. 1) may reproduce a workout video through a display (e.g., the display module 160 of FIG. 1). For example, the electronic device may play the workout video through the display. The terms "reproducing a workout video," "playing a workout video," and "replaying a workout video" may be used interchangeably herein.

According to various embodiments, the workout video to be reproduced may be a video stored in a memory (e.g., the memory 130 of FIG. 1) or may be a video received from an external device through a communication module (e.g., the communication module 190 of FIG. 1).

According to various embodiments, the electronic device may reproduce the workout video through the display included in the electronic device or transmit the workout video to the external electronic device through the communication module such that the workout video is displayed through the display included in the external electronic device.

According to various embodiments, in operation 220, the electronic device may identify the speed of a workout motion included in the workout video. For example, the workout video may include a plurality of types of workout movements, and each workout movement may include one pattern which may be repeatable multiple times.

According to various embodiments, the electronic device may identify the speed of a workout motion by identifying the time (e.g., temporal duration) for completing one pattern of the workout motion included in the workout video. For example, the electronic device may identify the speed of the workout motion via analysis of the workout video. According to various embodiments, when the type of workout motion is changed, the electronic device may identify or reidentify the speed of the changed type of workout motion. An operation of identifying the speed of a workout motion according to various embodiments will be described in detail with reference to FIGS. 3 and 4 below.

Figure 3:
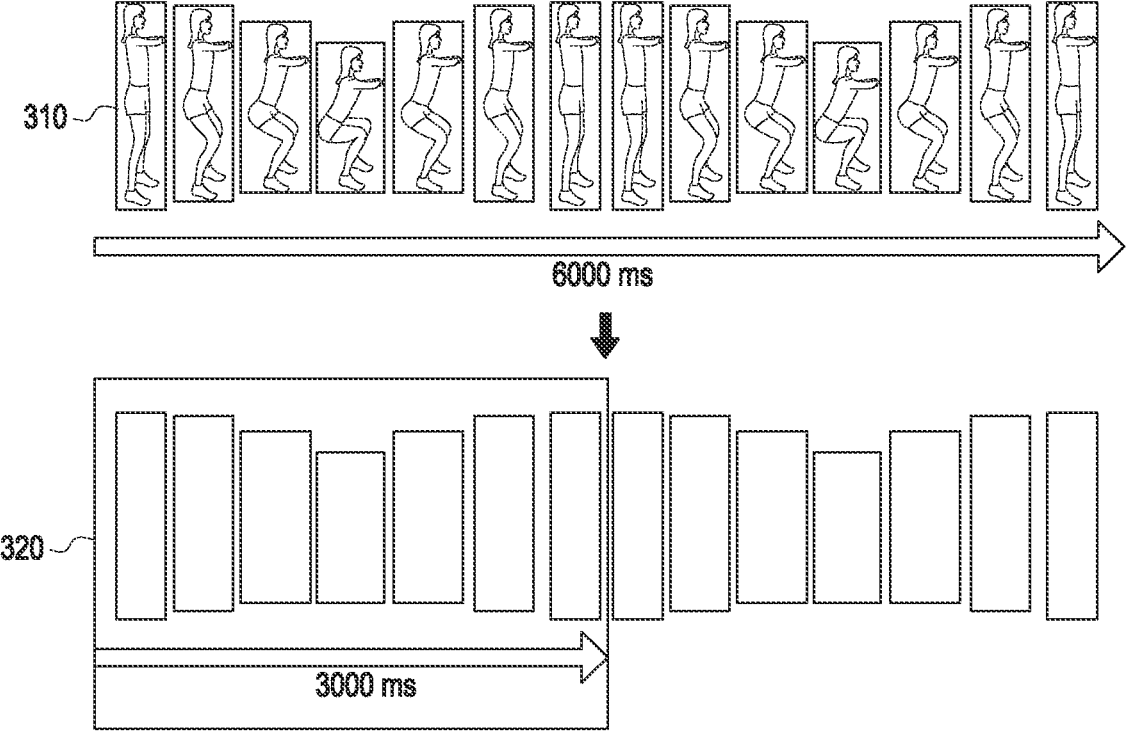
FIG. 3 illustrates an operation by an electronic device of identifying the speed of a workout motion included in a workout video according to various embodiments.

FIG. 3 illustrates an operation by an electronic device of identifying the speed of a workout motion included in a workout video according to various embodiments.

According to various embodiments, referring to FIG. 3, the electronic device (e.g., the electronic device of FIG. 1 or the processor 120 of FIG. 1) may detect an object 310 (e.g., a trainer or a user), which is a subject of the workout motion of the workout video, frame by frame. For example, the electronic device may detect the object 310 in the workout video, frame by frame.

According to various embodiments, the electronic device may identify repeated changing patterns of the object 310 by using at least one of a shape change, size change, or position change of the object 310 detected from each frame.

According to various embodiments, the electronic device may identify the time (e.g., temporal duration) for completing one pattern of the repeated changing patterns as the speed per pattern.

For example, referring to FIG. 3, the electronic device may obtain the time (e.g., temporal duration) of 3000 milliseconds (ms) as a time for completing one pattern 320 of the patterns of the object 310 repeated for 6000 ms, and obtain the time of the 3000 ms as a motion speed per pattern of the workout motion of the workout video.

Figure 4A:
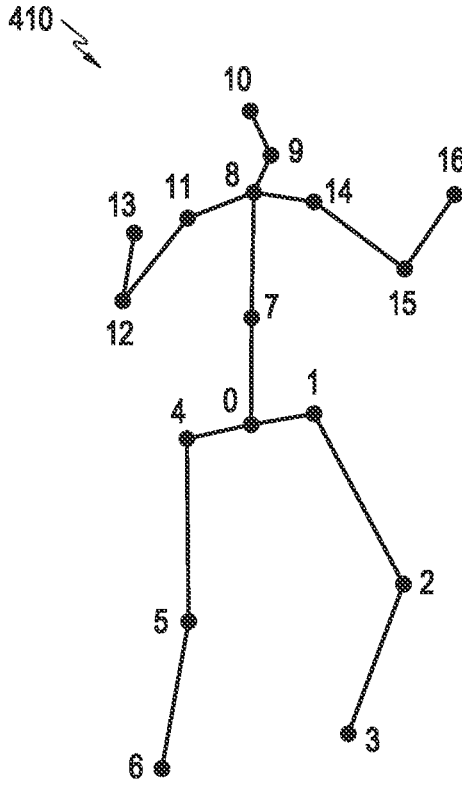
FIG. 4A illustrates an operation by an electronic device of identifying the speed of a workout motion included in a workout video according to various embodiments.
Figure 4B:
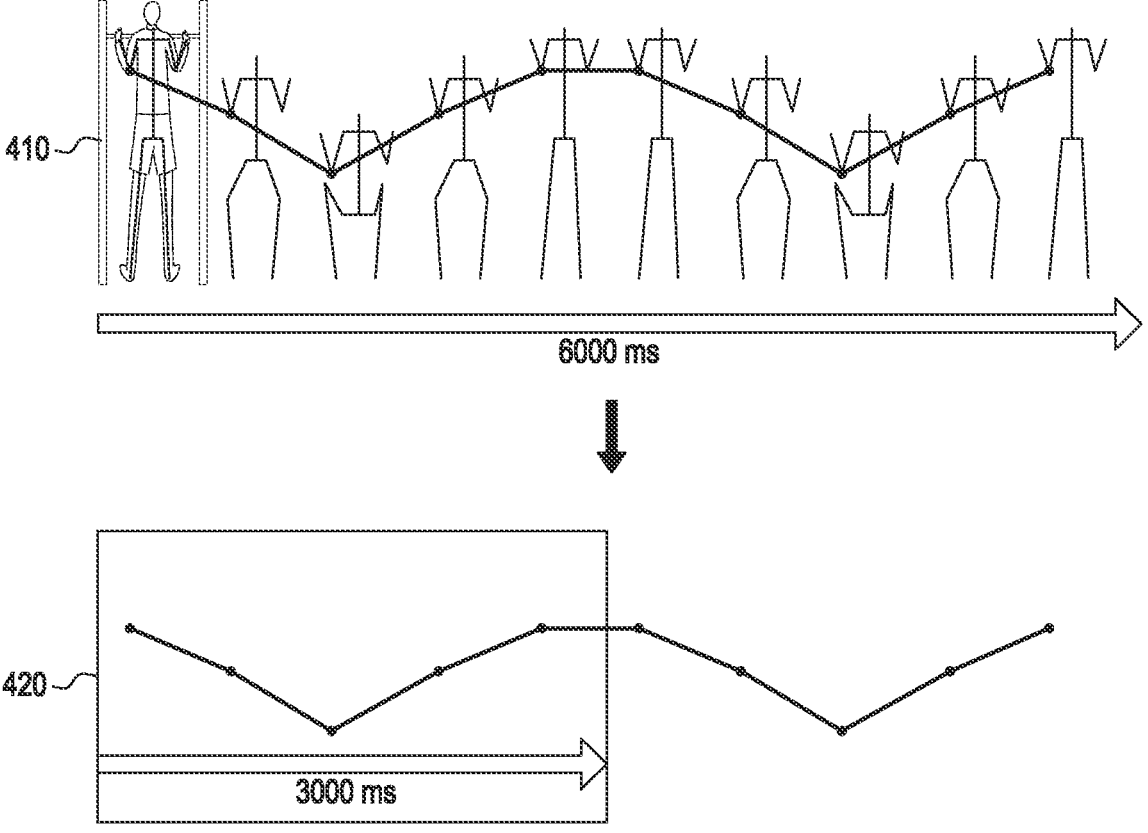
FIG. 4B illustrates an operation by an electronic device of identifying the speed of a workout motion included in a workout video according to various embodiments.

According to various embodiments, as shown in FIG. 3, it may be difficult to distinguish small motions only with the changing patterns of the object in the video, and as shown in FIGS. 4A and 4B, the motion speed may be identified by identifying the motion pattern for each part (e.g., feature point described herein).

FIG. 4A illustrates an operation by an electronic device of identifying the speed of a workout motion included in a workout video according to various embodiments.

According to various embodiments, the electronic device (e.g., the electronic device 101 of FIG. 1 or the processor 120 of FIG. 1) may identify a plurality of feature points (e.g., skeleton analysis) included in the workout video. According to various embodiments, the electronic device may identify a plurality of feature points by considering the position of a joint or the shape of an object included in the workout video, or may identify, as a feature point, the location on the user's body to which a wearable device is attached.

For example, referring to FIG. 4A, the electronic device may identify a plurality of feature points included in the workout video, as shown in [Table 1] below.

TABLE 1

| Number | Part |
| --- | --- |
| 0 | Bottom torso |
| 1 | Left hip |
| 2 | Left knee |
| 3 | Left foot |
| 4 | Right hit |
| 5 | Right knee |
| 6 | Right foot |
| 7 | Center torso |
| 8 | Upper torso |
| 9 | Neck base |
| 10 | Center head |
| 11 | Right shoulder |
| 12 | Right elbow |
| 13 | Right hand |
| 14 | Left shoulder |
| 15 | Left elbow |
| 16 | Left hand |

FIG. 4B illustrates an operation by an electronic device of identifying the speed of a workout motion included in a workout video according to various embodiments.

According to various embodiments, as shown in FIG. 4B, the electronic device (e.g., the electronic device 101 of FIG. 1 or the processor 120 of FIG. 1) may detect a plurality of feature points 410 for each frame of the workout video, and identify repeated changing patterns of the object by using at least one of positional changes of the plurality of feature points 410 detected from each frame.

According to various embodiments, the electronic device may identify the time (e.g., duration) associated with completing one pattern of the repeated changing patterns as the speed per pattern. In an example, the electronic device may identify the time (e.g., duration) for completing one pattern of the repeated changing patterns as the speed per pattern.

For example, referring to FIG. 4B, the electronic device may obtain the time (e.g., temporal duration) of 3000 ms as a time for completing one pattern 420 of the patterns of the plurality of feature points 410 repeated for 6000 ms. The electronic device may obtain the time (e.g., temporal duration) of 3000 ms as a motion speed per pattern of the workout motion of the workout video.

According to various embodiments, returning to FIG. 2, in operation 230, the electronic device may identify an audio signal distinct from the workout video.

According to various embodiments, the audio signal distinct from the workout video may be or include an audio signal (e.g., music) separate from an audio signal such as background music or voice included in the workout video, and the audio signal distinct from the workout video may be selected by the user or identified based on the user's preferences.

According to various embodiments, in operation 240, the electronic device may identify the target playback speed of the workout video at which the speed of the workout motion corresponds to the tempo of the audio signal.

According to various embodiments, the tempo of the audio signal may indicate the speed of the audio signal, and may be expressed by the number of quarter notes reproduced per one minute. For example, the tempo of the audio signal may be expressed in beats per minute (bpm), and a tempo (120 bpm) having 120 quarter notes reproduced per one minute may refer to a tempo having the speed twice that of the tempo (60 bpm) having 60 quarter notes reproduced per one minute.

According to various embodiments, the tempo of the audio signal may be determined when music represented by the audio signal is composed, and the electronic device may obtain the tempo of the audio signal from information included in the audio signal.

According to various embodiments, when an audio signal distinct from the workout video is reproduced by an external electronic device other than the electronic device, the electronic device may analyze the audio signal received through a microphone (e.g., the input module 150 of FIG. 1) to obtain the tempo of the audio signal.

According to various embodiments, the electronic device may identify the speed of the workout video at which the speed of the workout motion corresponds to the tempo of the audio signal.

According to various embodiments, the electronic device may synchronize a start time (e.g., a temporal instance) of the beat of the audio signal with a start time (e.g., a temporal instance) of a workout move. According to various embodiments, the beat of the audio signal may constitute the basis of a music pattern and refer to a pattern repeated at regular intervals, and according to aspects of the disclosure described herein, the beat of the audio signal may be related to a start time of a beat. The terms "start time," "first temporal instance," and "first time point" may be used interchangeably herein.

According to various embodiments, the electronic device may synchronize a start time (e.g., a temporal instance) of one pattern of the workout motion with a start time (e.g., a temporal instance) of the beat of the audio signal, and the electronic device may obtain the appropriate number of beats per one pattern of the workout move. For example, the number of beats per pattern may be obtained based on Equation (1) below to prevent a change in the speed of the workout video from exceeding a threshold change (e.g., a threshold increase, a threshold decrease) in speed.

Referring to the example Equations herein, the terms "time per pattern," "time duration per pattern," and "temporal duration per pattern" may be used interchangeably herein, and the terms "time per beat," "time duration per beat," and "temporal duration per beat" may be used interchangeably herein.

$$\text{Number of beats per pattern of workout motion} = \text{Round}\left(\frac{\text{time per pattern}}{\text{time per beat}}\right) \qquad \text{Equation (1)}$$

According to various embodiments, the time (ms) per beat may be $$\frac{60}{\text{Bpm}} \times 1000.$$

According to various embodiments, the electronic device may obtain the video speed, based on Equation (2) below.

$$\text{Video speed} = \frac{\text{time per pattern}}{\text{number of beats per pattern} \times \text{time per beat}} \qquad \text{Equation (2)}$$

According to various embodiments, when the number of beats per pattern is 0 due to the speed of an audio signal (e.g., bpm below a threshold bpm) and the speed of a workout motion (e.g., above a threshold speed) in a workout video, the number of patterns per beat may be obtained based on Equation (3) below, and the video speed may be obtained based on Equation (4).

$$\text{Number of patterns per beat} = \text{Round}\left(\frac{\text{time per beat}}{\text{time per pattern}}\right) \quad \text{Equation (3)}$$

$$\text{Video speed} = \frac{\text{time per beat}}{\text{number of patterns per beat} \times \text{time per pattern}} \quad \text{Equation (4)}$$

According to various embodiments, in operation 250, the electronic device may control the playback speed of the workout video by using the identified target playback speed of the workout video. For example, the electronic device may display the workout video at the identified playback speed. According to an embodiment, the electronic device may display the playback speed (e.g., 0.8× speed or ×0.8) through a display.

Figure 5:
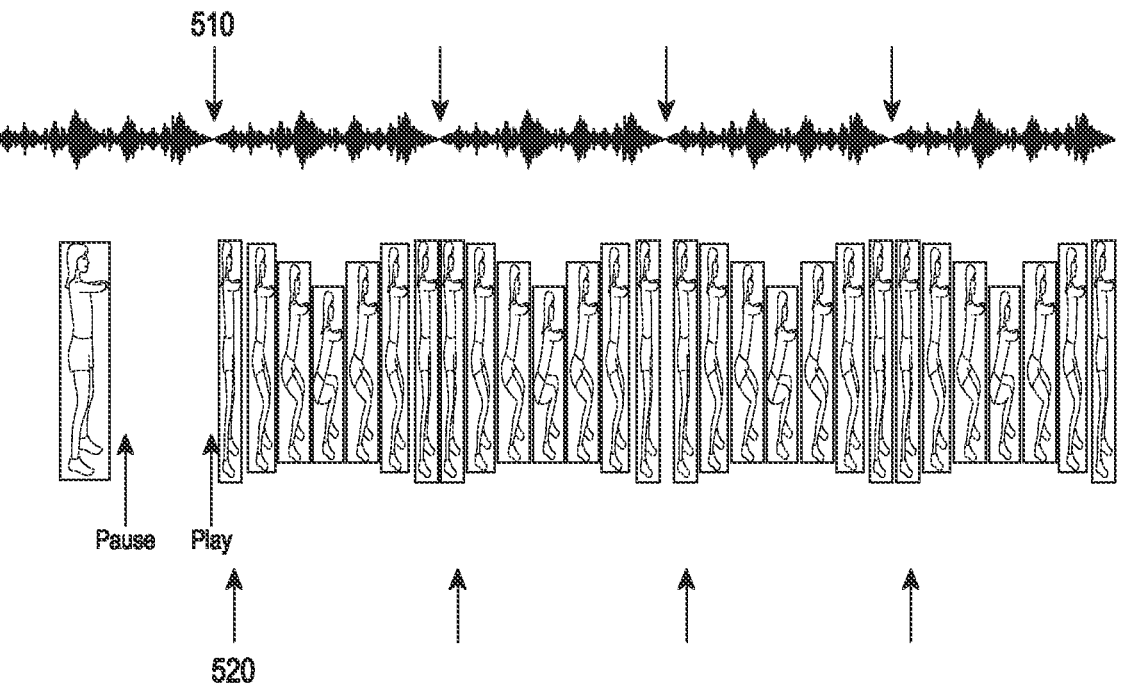
FIG. 5 illustrates an operation by an electronic device of reproducing a workout video, based on an audio signal according to various embodiments.

FIG. 5 illustrates an operation by an electronic device of reproducing a workout video, based on an audio signal according to various embodiments.

For example, referring to FIG. 5, the electronic device (e.g., the electronic device 101 of FIG. 1 or the processor 120 of FIG. 1) may pause playback of a workout video and then reproduce the workout video at a controlled playback speed, based on the tempo of an audio signal, such that a start point 520 of a workout motion included in the workout video at the controlled playback speed corresponds to a start point 510 of the beat of the audio signal.

For example, the electronic device may store both an audio signal included in the workout video and an audio signal separate from the workout video in an audio focus list such that both the audio signals have an audio focus status as an audio output target, so as to enable the audio signal included in the workout video and the audio signal separate from the workout video to be reproduced together.

According to various embodiments, the electronic device may obtain at least one of the user's workout speed or heart rate.

According to various embodiments, the electronic device may obtain the user's workout video through a camera (e.g., the camera module 180 of FIG. 1) included in the electronic device or through a camera included in an external electronic device and detect an object included in the user's workout video to obtain the user's workout speed. According to various embodiments, since a method for obtaining the user's workout speed, based on the user's workout video is the same as the method for obtaining the workout speed of the workout video shown in FIGS. 2 to 4, repeated descriptions will be omitted. The term "user's workout video" may refer to video images of the user as captured by a camera described herein.

According to various embodiments, the electronic device may display the user's workout video on a display (e.g., the display module 160 of FIG. 1) or may display the user's workout video together with the workout video.

As another embodiment, based on a sensed value obtained through a sensor of a wearable device attached to the user's body, the electronic device may analyze a pattern of the sensed value to obtain at least one of the user's workout speed or heart rate.

According to various embodiments, the electronic device may control the playback speed of the workout video, based on at least one of the user's workout speed or heart rate.

For example, the electronic device may control the playback speed of the workout video, based on the user's workout speed, such that the speed of the workout motion of the workout video corresponds to the user's motion speed. For example, when the original speed of the workout video is greater than the user's workout speed (e.g., the original speed of the workout motion in the workout video is greater than the user's motion speed), the user may find difficulty in matching the original speed of the workout video and thus lose his/her interest or the risk of injury may increase. Accordingly, the electronic device may induce the user to perform the workout according to the original speed of the workout video by gradually (e.g., over one or more iterations) changing the speed of the workout video.

According to various embodiments, when the user's workout speed is faster or slower than (e.g., greater than or less than) the speed of the workout motion of the workout video, the electronic device may control the playback speed of the workout video, based on Equation (5) below.

$$\text{Video speed} = \frac{\text{time per pattern of workout motion in workout video}}{\text{time per pattern of user's workout motion}} \quad \text{Equation (5)}$$

According to various embodiments, when the user's workout speed is greater than the workout speed of the workout video by a configured value (e.g., 1.5 times) or more, the electronic device may provide a notification that the user's workout speed is exceeding the workout speed by the configured value (e.g., a notification that the user's workout speed is "too fast") in order to reduce the risk of user's injury, and may no longer perform control to increase the playback speed of the workout video. For example, the electronic device may refrain from further increasing the playback speed of the workout video.

Figure 6:
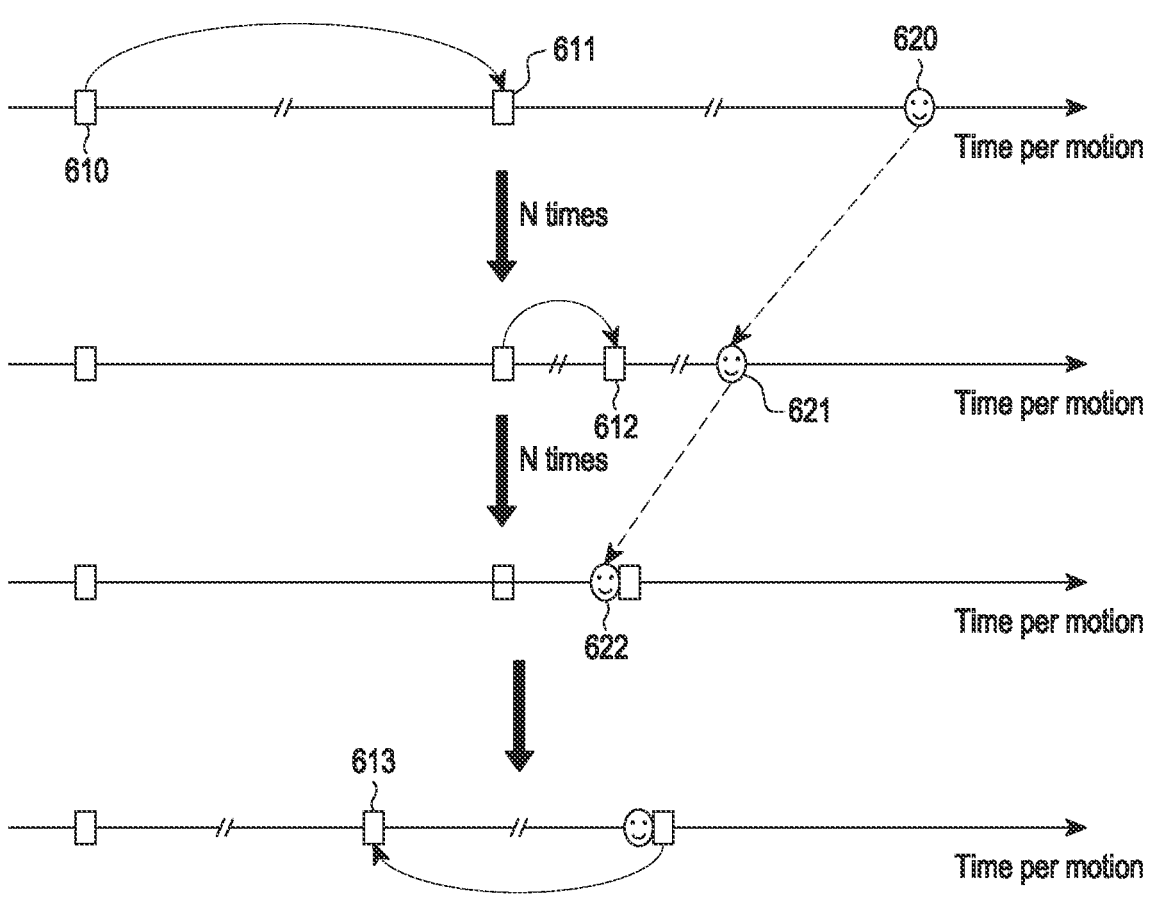
FIG. 6 illustrates an operation by an electronic device of controlling the playback speed of a workout video, based on a user's motion speed according to various embodiments.

As another embodiment, when the user's workout speed is less than the workout speed of the workout video, the electronic device may gradually control the playback speed of the workout video to improve the user's workout speed (e.g., increase the user's workout speed to equal at least the original workout speed of the workout video), as shown in FIG. 6.

FIG. 6 illustrates an operation by an electronic device of controlling the playback speed of a workout video, based on a user's motion speed according to various embodiments. In some aspects, the terms "user's motion speed" and "user's workout speed" may be used interchangeably herein.

According to various embodiments, referring to FIG. 6, the electronic device (e.g., the electronic device 101 or the processor 120 of FIG. 1) may obtain the original speed 610 of the workout video and a user's workout speed 620. For example, the original speed 610 of the workout video may be the time (e.g., temporal duration) per pattern of the workout motion included in the workout video, and the user's workout speed 620 may be the time (e.g., temporal duration) per pattern of the user's workout motion. For example, when the time per pattern of a workout motion is small (e.g., below a threshold temporal duration), the workout speed may be "fast."

According to various embodiments, when the user's workout speed 620 is less than the original speed 610 of the workout video by a configured value or more, the electronic device may control the playback speed of the workout video such that a first speed 611 of the next workout motion (as played in the workout video) is an intermediate value of the user's workout speed 620 and the original speed 610 of the workout video. For example, the first speed 611 may be greater than the user's workout speed 620 and less than the original speed 610 of the workout video.

For example, the electronic device may identify the target playback speed of the workout video, based on Equation (6) below, and identify the video speed, based on Equation (7). In an example, with reference to Equation (7), the terms "time per workout video pattern" and "temporal duration per workout video pattern" may be used interchangeably herein, the terms "time per current video pattern" and "temporal duration per current video pattern" may be used interchangeably herein, and the terms "time per next video pattern" and "temporal duration per next video pattern" may be used interchangeably herein.

$$\text{Time per next pattern of video} = \qquad\qquad\qquad\text{Equation (6)}$$
$$\frac{\text{time per pattern of user's motion} + \text{time per workout video pattern}}{2}$$

$$\text{Video speed} = \frac{\text{time per current video pattern}}{\text{time per next video pattern}} \qquad\text{Equation (7)}$$

For example, when the time per pattern corresponding to the original speed 610 is 1 second, and the time per pattern corresponding to the user's workout speed 620 is 2 seconds, the electronic device may identify that the time per next pattern of the video is 1.5 seconds, based on Equation (6). For example, based on Equation (7), the electronic device may identify the video speed as 0.6 by dividing 1 second, which is the time per current video pattern, by 1.5 seconds, which is the identified time per next pattern.

According to various embodiments, the electronic device may set the workout speed of the workout video to the first speed 611 that is less than the original speed 610 and greater than the user's workout speed 620, and the electronic device may repeat the pattern of the workout motion N times (e.g., the electronic device may replay the workout motion N times).

According to various embodiments, when the user's workout speed 621 is less than the first speed 611 by a configured value or more even after repeating the workout pattern of the first speed 611 N times, the electronic device may adjust the playback speed of the workout video such that a second speed 612 of the next workout motion (as played in the workout video) is an intermediate value of the user's workout speed 621 and the first speed 611 of the workout video. For example, the second speed 612 may be greater than the user's workout speed 621 and less than the first speed 611. For example, the electronic device may obtain the second speed 612 of the workout motion and the video speed, based on the above-described Equations (6) and Equations (7).

According to various embodiments, the electronic device may set the workout speed of the workout video to the second speed 612 that is less than the first speed 611 and greater than the user's workout speed 621, and the electronic device may repeat the pattern of the workout motion N times (e.g., the electronic device may replay the workout motion N times).

According to various embodiments, when the difference between the user's workout speed 622 and the second speed 612 is less than the configured value after repeating the workout pattern of the second speed 612 N times, the electronic device may control the playback speed of the workout video such that a third speed 616 of the next workout motion (as played in the workout video) is an intermediate value of the user's workout speed 622 and the original speed 610 of the workout video. For example, the third speed 613 may be greater than the user's workout speed 622 and less than the original speed 610.

According to various embodiments, when the difference between the user's workout speed 622 and the third speed 613 is less than the set value after repeating the workout pattern of the third speed 613 N times, the electronic device may gradually adjust the playback speed of the workout video (e.g., increase the playback speed over one or more iterations) such the workout speed of the next workout motion is close to the original speed 610 of the workout video. For example, the electronic device may gradually adjust the playback speed of the workout video such that a difference value between the playback speed and the workout speed is less than or equal to a threshold difference value.

As described above, when the user's workout speed is significantly less than the workout speed of the workout video (e.g., less than the workout speed by a threshold speed difference or more), the electronic device may perform control such that the workout speed of the workout motion is reduced and then is gradually increased, thereby inducing the user to improve his/her workout ability. For example, the electronic device may decrease the playback speed of the workout video and then increase (e.g., over one or more iterations) the playback speed of the workout video, thereby inducing the user to improve his/her workout ability.

According to various embodiments, when the type of workout motion is changed, the electronic device may further control the playback speed of the workout video (e.g., update the playback speed), based on the speed of the changed type of workout motion.

According to various embodiments, when the electronic device controls the playback speed of the workout video, based on the user's heart rate, the electronic device may identify the target playback speed of the workout video, based on [Table 2] below. [Table 2] shows the target heart rate and the maximum heart rate for the user's age according to various embodiments.

TABLE 2

| Age | Target heart rate (beat/min) | Maximum heart rate |
|-----|------------------------------|--------------------|
| 20 | 100-150 | 200 |
| 25 | 98-146 | 195 |
| 30 | 95-142 | 190 |
| 35 | 93-138 | 185 |
| 40 | 90-135 | 180 |
| 45 | 88-131 | 175 |
| 50 | 85-127 | 170 |
| 55 | 83-123 | 165 |
| 60 | 80-120 | 160 |

According to various embodiments, when the user's heart rate is less than the target heart rate, the electronic device may increase the playback speed of the workout video. For example, as shown in FIG. 6, the electronic device may change the workout speed of a workout video based on the user's workout speed, or control the playback speed of the current workout video such that the workout pattern is repeated N times at a configured speed (e.g., 1.1 times).

According to various embodiments, the electronic device may provide a notification to the user that the speed of the workout video is to be increased due to the user's low heart rate, or provide a guide prompting the user to increase the speed of the workout video.

According to various embodiments, when the user's heart rate is greater than the maximum heart rate, the electronic device may reduce the playback speed of the workout video. For example, when the user's workout speed is less than the workout speed of the workout video and the user's heart rate is greater than the maximum heart rate, the electronic device may control the workout speed of the workout video such that the workout pattern is repeated N times at a configured speed (e.g., 0.9 times the original workout speed). According to various embodiments, when the user's heart rate is greater than the maximum heart rate even after repeating N times at the configured speed, the electronic device may further adjust the workout speed of the workout video to the configured speed (e.g., 0.9×0.9 times the original workout speed).

As another embodiment, when the user's workout speed is greater than the workout speed of the workout video and the user's heart rate is greater than the maximum heart rate, the electronic device may provide a guide prompting the user to follow the workout speed of the workout video.

According to various embodiments, the electronic device may further subdivide the target heart rate. For example, the electronic device may obtain a target heart rate in consideration of the purpose of the user's workout.

Figure 7:
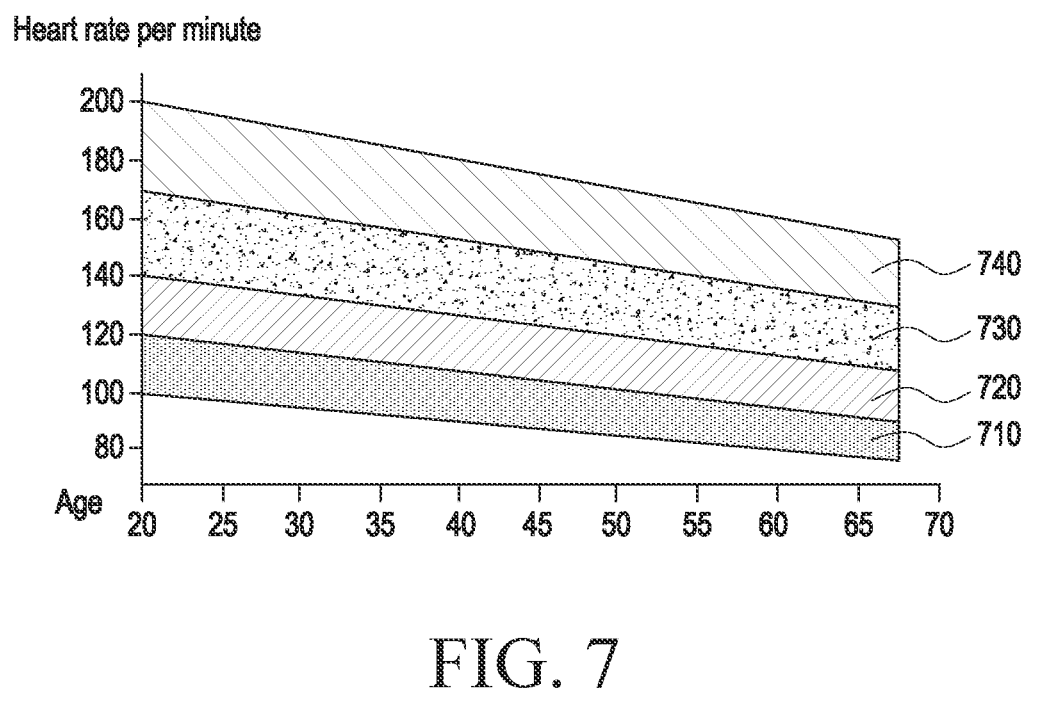

FIG. 7 illustrates a target heart rate according to various embodiments.

According to various embodiments, referring to FIG. 7, the electronic device (e.g., the electronic device 101 of FIG. 1 or the processor 120 of FIG. 1) may subdivide the target heart rate zone into a first target heart rate zone 710 for the purpose of light workout for a beginner, a second target heart rate zone 720 for the purpose of weight management, a third target heart rate zone 730 for the purpose of improving cardiorespiratory endurance, and a fourth target heart rate zone 740 for the purpose of high-intensity workout by a professional trainer.

For example, the first target heart rate zone 710 may be 50-60% of the maximum heart rate, the second target heart rate zone 720 may be 60-70% of the maximum heart rate, the third target heart rate zone 730 may be 70-85% of the maximum heart rate, and the fourth target heart rate zone 740 may be 85-100% of the maximum heart rate.

According to various embodiments, the electronic device may configure a target heart rate, based on a workout purpose input by a user and control the playback speed of a video, based on the target heart rate.

According to various embodiments, the electronic device may control the playback speed of the workout video, based on at least one of the user's motion speed and the user's heart rate, and the electronic device may additionally control the playback speed of the workout video, based on an audio signal separate from the workout video. When the playback speed of the workout video is controlled based on the user's workout speed or the user's heart rate, the variation in the playback speed of the workout video may be greater than a threshold variation value. However, by controlling the playback speed of the workout video based on an audio signal, the existing playback speed may be controlled to be maintained. Accordingly, the workout video may be reproduced at the playback speed suitable for the user's intention.

Figure 8:
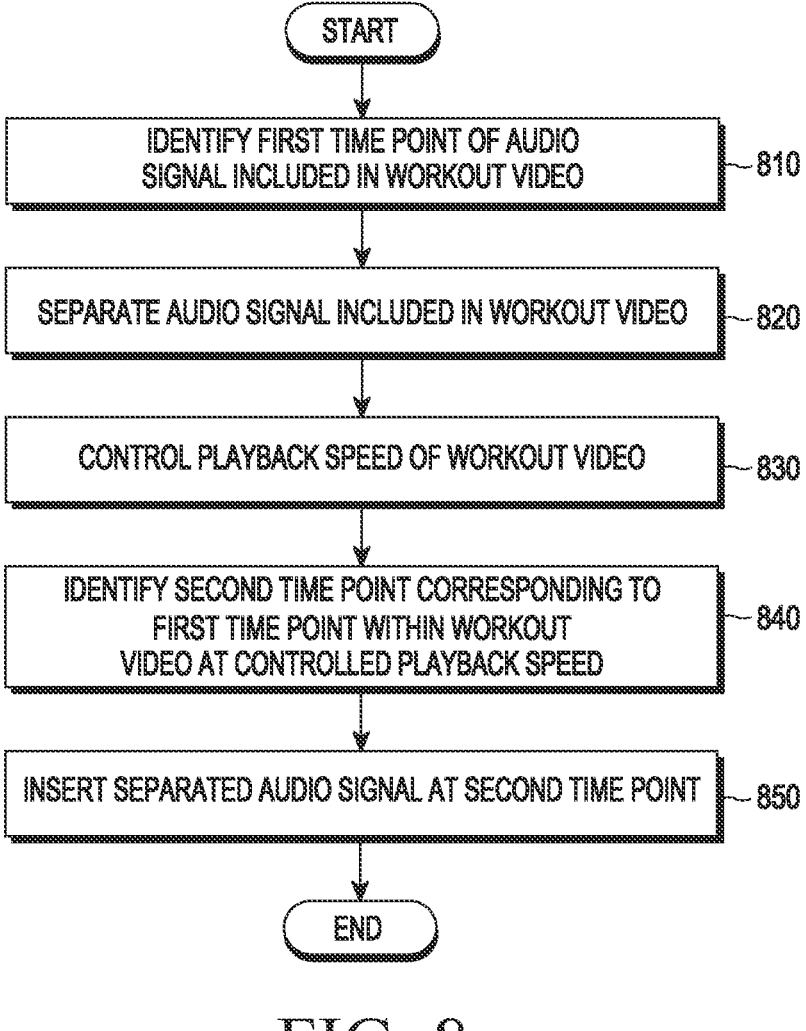
FIG. 8 illustrates an operation of processing an audio signal included in a workout video of an electronic device according to various embodiments.

FIG. 8 illustrates an operation of processing an audio signal included in a workout video of an electronic device according to various embodiments.

According to various embodiments, referring to FIG. 8, in operation 810, the electronic device (e.g., the electronic device 101 of FIG. 1 or the processor 120 of FIG. 1) may identify a first time point of an audio signal included in a workout video. For example, the audio signal included in the workout video may be background music or a trainer's voice included in the workout video.

Figure 9A:
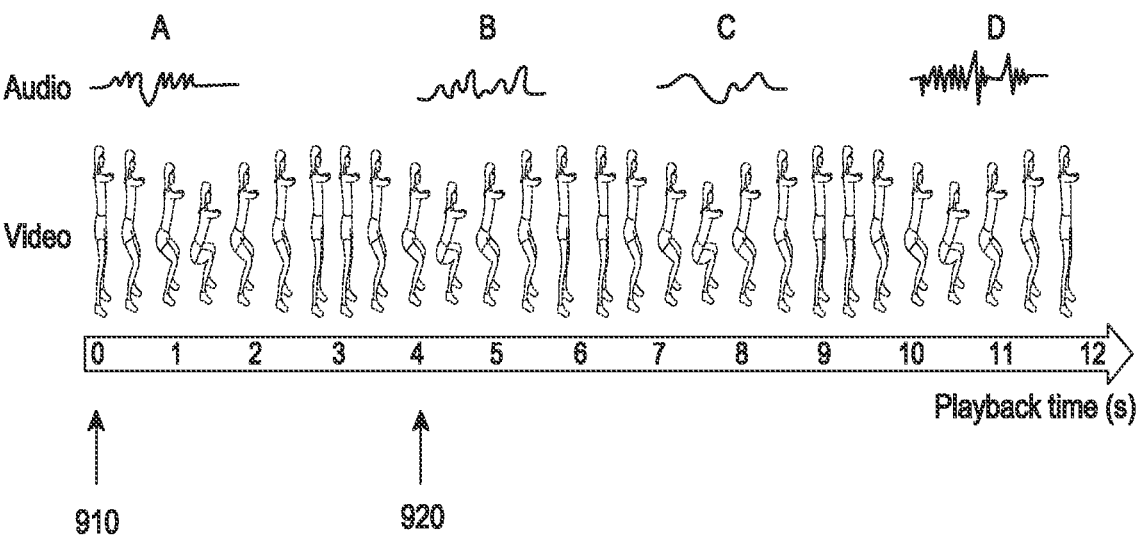
FIG. 9A illustrates an operation by an electronic device of processing an audio signal included in a workout video according to various embodiments.

FIG. 9A illustrates an operation by an electronic device of processing an audio signal included in a workout video according to various embodiments.

For example, referring to FIG. 9A, the electronic device may identify a first time point of at least one audio signal (e.g., A, B, C, and D) included in a workout video. For example, the electronic device may identify a first time point 910 of audio signal A at "0 seconds", a first time point 920 of audio signal B at "4 seconds", a first time point of audio signal C at "7 seconds", and a first time point of audio signal D at "10 seconds".

According to various embodiments, the electronic device may store information on the first time point of each audio signal in a memory (e.g., the memory 130 of FIG. 1).

According to various embodiments, in operation 820, the electronic device may extract an audio signal included in the workout video. For example, the electronic device may extract the background music or the trainer's voice included in the workout video from the workout video.

According to various embodiments, when an audio signal (e.g., background music) extracted from the workout video is reproduced, the electronic device may delete the audio signal included in the workout video.

According to various embodiments, in operation 830, the electronic device may control the playback speed of the workout video. For example, the electronic device may control the playback speed of the workout video, based on the user's workout speed, the user's heart rate, or the audio signal separate from the workout video. For example, the electronic device may display the workout video at the identified playback speed. The operation of controlling the playback speed of a workout video according to various embodiments has been given in the descriptions of FIGS. 2, 5 to 7, and thus repeated descriptions thereof will be omitted.

According to various embodiments, in operation 840, the electronic device may identify a second time point corresponding to the first time point within the workout video at the controlled playback speed.

Figure 9B:
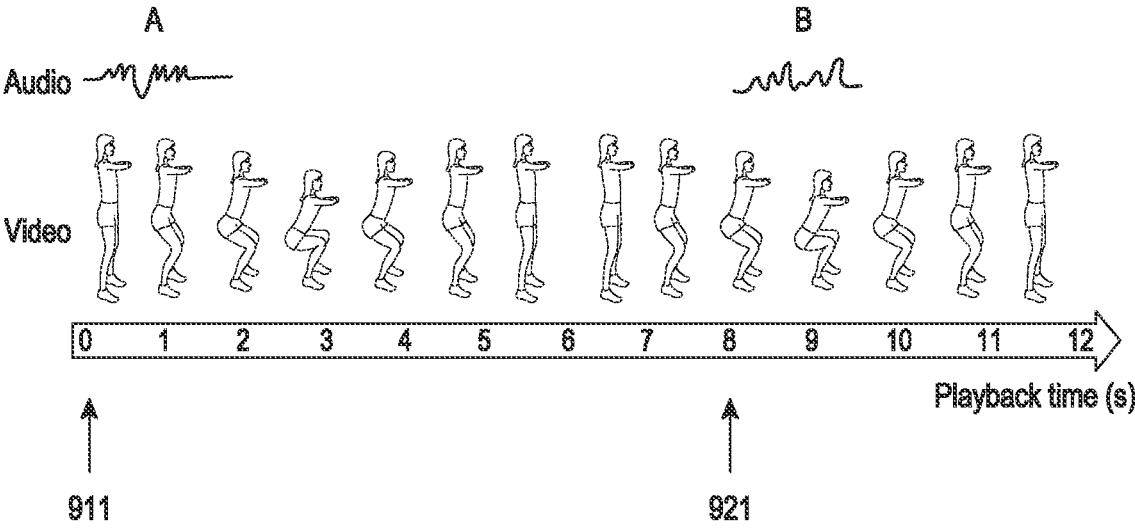
FIG. 9B illustrates an operation by an electronic device of processing an audio signal included in a workout video according to various embodiments.

FIG. 9B illustrates an operation by an electronic device of processing an audio signal included in a workout video according to various embodiments.

For example, referring to FIG. 9B, when the playback speed of a workout video is set to 0.5 times (e.g., 0.5 times the original playback speed of the workout video), the electronic device may identify a second time point 911 of audio signal A at "0 seconds" and a second time point 921 of audio signal B at "8 seconds" within the workout video, the playback speed of which has been set to 0.5 times. According to various embodiments, although not shown in FIG. 9B, the electronic device may identify a second time point of audio signal C at "14 seconds" and a second time point of audio signal D at "20 seconds".

According to various embodiments, in operation 850, an extracted audio signal may be inserted at the second time point.

For example, referring to FIG. 9B, the electronic device may insert audio signal A at a time point corresponding to "0 seconds" of the workout video, the playback speed of which has been controlled to 0.5 times, and insert audio signal B at a time point corresponding to "8 seconds" of the workout video. According to various embodiments, the playback speed of the audio signal may be the same as the original playback speed of the workout video. For example, the electronic device may insert an original audio signal into a workout video at the set playback speed. In another example, when the playback speed of the audio signal is controlled together with the workout video, the electronic device may inversely adjust only the playback speed of the audio signal and thus reproduce the audio signal together with the workout video at the controlled playback speed.

According to various embodiments, when the background music is extracted from the workout video, the electronic device may insert the original background music at a time point corresponding to "0 seconds" of the workout video at the set playback speed. As another embodiment, when an audio signal (e.g., background music) extracted from the workout video is reproduced, the electronic device may delete the audio signal from the workout video.

According to various embodiments, an electronic device may provide a separate user interface (UI) for controlling the speed of a workout video. The electronic device may provide a UI for whether to use a speed control function of the workout video, and according to reception of an input for using the speed control function of the workout video from a user, the electronic device may provide the workout video at a speed suitable for the user when reproducing the workout video.

According to various embodiments, an electronic device (e.g., the electronic device 101) may include a display (e.g., the display module 160) and at least one processor (e.g., the processor 120) operatively connected to the display. The at least one processor may be configured to reproduce a workout video through the display, identify the speed of a workout motion included in the workout video, identify an audio signal distinct from the workout video, identify the target playback speed of the workout video at which the speed of the workout motion corresponds to the tempo of the audio signal, and set the playback speed of the workout video to the identified target playback speed of the workout video.

According to various embodiments, the at least one processor may synchronize a start time of the workout motion and a start time of a beat of the audio signal.

According to various embodiments, the at least one processor may obtain a pattern of the workout motion included in the workout video, and identify the speed of the workout motion, based on the pattern.

According to various embodiments, the at least one processor may identify a plurality of feature points in the workout video and obtain a pattern of the workout motion, based on a movement pattern of the plurality of feature points.

According to various embodiments, the at least one processor may obtain at least one of a user's workout speed and a user's heart rate, control the playback speed of the workout video, based on at least one of the user's workout speed and the user's heart rate, and control, based on the tempo of the audio signal, the playback speed of the workout video having been controlled based on at least one of the user's workout speed and the user's heart rate.

According to various embodiments, the at least one processor may control the playback speed of the workout video such that the playback speed of the workout video corresponds to the user's workout speed.

According to various embodiments, the at least one processor may control, when (e.g., in a case in which) the user's workout speed is less than the speed of the workout motion included in the workout video, a playback speed of the workout video such that a speed of a next workout motion is an intermediate value of the user's workout speed and the speed of the workout motion, and when (e.g., in a case in which) a difference between the user's workout speed and the next workout motion is less than a configured value, perform control (e.g., gradually adjust the playback speed of the workout video) such that the playback speed of the workout video becomes close to the original playback speed.

According to various embodiments, the at least one processor may obtain a target heart rate and control the playback speed of the workout video, based on a difference between the user's heart rate and the target heart rate.

According to various embodiments, the at least one processor may identify a first time point of an audio signal included in the workout video, extract the audio signal included in the workout video, set the playback speed of the workout video to the identified target playback speed of the workout video, identify a second time point corresponding to the first time point within the workout video at the controlled playback speed, and insert the extracted audio signal at the second time point.

According to various embodiments, the at least one processor may delete background music included in the workout video.

According to various embodiments, a method for controlling an electronic device may include reproducing a workout video through a display, identifying the speed of a workout motion included in the workout video, identifying an audio signal distinct from the workout video, identifying the target playback speed of the workout video at which the speed of the workout motion corresponds to the tempo of the audio signal, and setting the playback speed of the workout video to the identified target playback speed of the workout video.

According to various embodiments, the method may further include synchronizing a start time of the workout motion and a start time of a beat of the audio signal.

According to various embodiments, the identifying of the speed of the workout motion included in the workout video may include obtaining a pattern of the workout motion included in the workout video, and identifying the speed of the workout motion, based on the pattern.

According to various embodiments, the obtaining of the pattern of the workout motion included in the workout video may include identifying a plurality of feature points in the workout video and obtaining a pattern of the workout motion, based on a movement pattern of the plurality of feature points.

According to various embodiments, the method may further include obtaining at least one of a user's workout speed and a user's heart rate and controlling the playback speed of the workout video, based on at least one of the user's workout speed or the user's heart rate, where the controlling of the playback speed of the workout video to the identified target playback speed of the workout video may include controlling, based on the tempo of the audio signal, the playback speed of the workout video having been controlled based on at least one of the user's workout speed or the user's heart rate.

According to various embodiments, the controlling of the playback speed of the workout video, based on at least one of the user's workout speed or the user's heart rate may include controlling the playback speed of the workout video such that the playback speed of the workout video corresponds to the user's workout speed.

According to various embodiments, the controlling of the playback speed of the workout video, based on at least one of the user's workout speed or the user's heart rate may include controlling, when the user's workout speed is less than a speed of the workout motion included in the workout video, a playback speed of the workout video such that the speed of a next workout motion is an intermediate value of the user's workout speed and the speed of the workout motion, and when a difference between the user's workout speed and the next workout motion is less than a configured value, performing control (e.g., gradually adjusting the playback speed of the workout video) such that the playback speed of the workout video becomes close to the original playback speed.

According to various embodiments, the method may further include obtaining a target heart rate, where the controlling of the playback speed of the workout video, based on at least one of the user's workout speed or the user's heart rate may include controlling the playback speed of the workout video, based on a difference between the user's heart rate and the target heart rate.

According to various embodiments, the method may further include identifying a first time point of an audio signal included in the workout video, extracting the audio signal included in the workout video, controlling the playback speed of the workout video to the identified target playback speed of the workout video, identifying a second time point corresponding to the first time point within the workout video at the controlled playback speed, and inserting the extracted audio signal at the second time point.

According to various embodiments, the method may further include deleting background music included in the workout video.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a display;
a microphone;
at least one processor operatively connected to the display; and
memory storing instructions that, when executed by the at least one processor individually or collectively, cause the electronic device to:
display a workout video through the display;
obtain a pattern of workout motion included in the workout video;
identify a speed of the workout motion included in the workout video, based on the pattern;
obtain tempo information on a first audio signal that is received by the microphone of the electronic device while displaying the workout video, wherein the first audio signal is different from a second audio signal of the workout video;
identify a target playback speed of the workout video at which the speed of the workout motion corresponds to a tempo of the first audio signal based on the tempo information; and
display the workout video at the identified target playback speed.

2. The electronic device of claim 1, wherein the instructions further cause the electronic device to synchronize a start time of the workout motion and a start time of a beat of the first audio signal.

3. The electronic device of claim 1, wherein the instructions further cause the electronic device to:
identify a plurality of feature points included in the workout video; and
obtain the pattern of the workout motion, based on a movement pattern of the plurality of feature points.

4. The electronic device of claim 1, wherein the instructions further cause the electronic device to:
obtain at least one of a user's workout speed and a user's heart rate;
control the target playback speed of the workout video, based on at least one of the user's workout speed or the user's heart rate; and
control, based on the tempo of the first audio signal, the controlled target playback speed of the workout video.

5. The electronic device of claim 4, wherein the instructions further cause the electronic device to control the target playback speed of the workout video to correspond to the user's workout speed.

6. The electronic device of claim 4, wherein the instructions further cause the electronic device to:
based on the user's workout speed being less than the speed of the workout motion included in the workout video, control the target playback speed of the workout video such that a speed of a next workout motion is an intermediate value of the user's workout speed and the speed of the workout motion; and
based on a difference between the user's workout speed and the speed of the next workout motion being less than a configured value, adjust the target playback speed of the workout video to be gradually close to an original playback speed.

7. The electronic device of claim 4, wherein the instructions further cause the electronic device to:
obtain a target heart rate; and control the target playback speed of the workout video, based on a difference between the user's heart rate and the target heart rate.

8. The electronic device of claim 1, wherein the instructions further cause the electronic device to:
identify a first time point of the second audio signal included in the workout video;
extract the second audio signal included in the workout video;
display the workout video at the identified target playback speed;
identify a second time point, corresponding to the first time point, within the workout video at the target playback speed; and
insert the extracted second audio signal at the second time point.

9. The electronic device of claim 1, wherein the instructions further cause the electronic device to delete background music included in the workout video.

10. A method for controlling an electronic device, the method comprising:
displaying a workout video through a display;
obtaining a pattern of a workout motion included in the workout video;
identifying a speed of the workout motion included in the workout video, based on the pattern;
obtaining tempo information on a first audio signal that is received by a microphone of the electronic device while displaying the workout video, wherein the first audio signal is different from a second audio signal of the workout video;
identifying a target playback speed of the workout video at which the speed of the workout motion corresponds to a tempo of the first audio signal based on the tempo information; and
displaying the workout video at the identified target playback speed.

11. The method of claim 10, further comprising synchronizing a start time of the workout motion and a start time of a beat of the first audio signal.

12. The method of claim 10, wherein the obtaining of the pattern of the workout motion included in the workout video comprises:
identifying a plurality of feature points included in the workout video; and
obtaining the pattern of the workout motion, based on a movement pattern of the plurality of feature points.

13. The method of claim 10, further comprising:
obtaining at least one of a user's workout speed and a user's heart rate; and
controlling the target playback speed of the workout video, based on at least one of the user's workout speed or the user's heart rate,
wherein the displaying the workout video at the identified target playback speed comprises controlling, based on the tempo of the first audio signal, the controlled target playback speed of the workout video.

14. The method of claim 13, wherein the controlling the target playback speed of the workout video, based on at least one of the user's workout speed or the user's heart rate comprises controlling the target playback speed of the workout video to correspond to the user's workout speed.

15. The method of claim 13, wherein the controlling the target playback speed of the workout video, based on at least one of the user's workout speed or the user's heart rate comprises:

controlling, based on the user's workout speed being less than the speed of the workout motion included in the workout video, the target playback speed of the workout video such that a speed of a next workout motion is an intermediate value of the user's workout speed and the speed of the workout motion; and adjusting, based on a difference between the user's workout speed and the speed of the next workout motion being less than a configured value, the target playback speed of the workout video to be gradually close to an original playback speed.

16. The method of claim 13, further comprising:

obtaining a target heart rate; and controlling the target playback speed of the workout video, based on a difference between the user's heart rate and the target heart rate.

17. The method of claim 10, further comprising:

identifying a first time point of the second audio signal included in the workout video;

extracting the second audio signal included in the workout video;

displaying the workout video at the identified target playback speed;

identifying a second time point, corresponding to the first time point, within the workout video at the target playback speed; and inserting the extracted second audio signal at the second time point.

18. The method of claim 10, further comprising deleting background music included in the workout video.

* * * * *